(12) United States Patent
Wang et al.

(10) Patent No.: US 11,577,220 B2
(45) Date of Patent: Feb. 14, 2023

(54) CELLULOSE NANOCRYSTAL-SUPPORTED SODIUM ALGINATE ADSORBENT

(71) Applicant: Jiangnan University, Wuxi (CN)

(72) Inventors: Shuo Wang, Wuxi (CN); Qixin Liu, Wuxi (CN); Fei Shen, Wuxi (CN); Ji Li, Wuxi (CN); Yong Wang, Wuxi (CN); Xuesong Yi, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 0 days.

(21) Appl. No.: 17/845,048

(22) Filed: Jun. 21, 2022

(65) Prior Publication Data

US 2022/0323932 A1    Oct. 13, 2022

Related U.S. Application Data

(63) Continuation of application No. PCT/CN2021/133060, filed on Nov. 25, 2021.

(30) Foreign Application Priority Data

Dec. 14, 2020 (CN) .......................... 202011470643.4

(51) Int. Cl.
| | | |
|---|---|---|
| *B01J 20/24* | (2006.01) | |
| *C02F 11/13* | (2019.01) | |
| *C02F 11/145* | (2019.01) | |
| *B01J 20/28* | (2006.01) | |
| *B01J 20/30* | (2006.01) | |
| *C02F 1/28* | (2023.01) | |
| *C02F 11/06* | (2006.01) | |
| *C02F 101/30* | (2006.01) | |
| *C02F 103/28* | (2006.01) | |

(52) U.S. Cl.
CPC ......... *B01J 20/24* (2013.01); *B01J 20/28007* (2013.01); *B01J 20/3021* (2013.01); *B01J 20/3071* (2013.01); *B01J 20/3078* (2013.01); *B01J 20/3085* (2013.01); *C02F 1/286* (2013.01); *C02F 11/06* (2013.01); *C02F 11/13* (2019.01); *C02F 11/145* (2019.01); *C02F 2101/30* (2013.01); *C02F 2103/28* (2013.01)

(58) Field of Classification Search
CPC ........ C02F 11/13; C02F 22/145; C02F 1/286; C02F 11/06; C02F 2101/30; C02F 2103/28; B01J 20/24; B01J 20/28007; B01J 20/3021; B01J 20/3071; B01J 20/3078; B01J 20/3085

USPC ......................................................... 502/404
See application file for complete search history.

(56) References Cited

U.S. PATENT DOCUMENTS

2009/0281302 A1    11/2009    Aharon

FOREIGN PATENT DOCUMENTS

| CN | 101020718 A | 8/2007 |
|---|---|---|
| CN | 101155957 A | 4/2008 |
| CN | 103590282 A | 2/2014 |
| CN | 105713100 A | 6/2016 |
| CN | 108014760 A | 5/2018 |
| CN | 109505033 A | 3/2019 |
| CN | 109972233 A | 7/2019 |
| CN | 111440248 A | 7/2020 |
| WO | 2012119229 A1 | 9/2012 |

OTHER PUBLICATIONS

Mingshuai Ma et. al "Lignin-containing cellulose nanocrystals/sodium alginate beads as highly effective adsorbents for cationic organic dyes" International J. Biological Macromolecules, Aug. 2, 2019, vol. 139 p. 640-646.

Dai, Lei et. al. "Preparation and Investigation of TEMPO-oxidized cellulose nanofibers and their composite films" Doctor Thesis Database of China. Nov. 30, 2015. p. 33-55.

*Primary Examiner* — Edward M Johnson
(74) *Attorney, Agent, or Firm* — IPro, PLLC; Na Xu

(57) ABSTRACT

The present disclosure discloses a cellulose nanocrystal-supported sodium alginate adsorbent and use thereof in enriching organic phosphorus in wastewater, belonging to the technical field of environmental engineering. Cellulose nanocrystals are prepared from papermaking deinking sludge through chemical conditioning, drying, crushing, chemical oxidation and microwave assisted separation, and then supported on alginate under weakly acidic conditions to provide the cellulose nanocrystals with the ability to enrich organic phosphorus in wastewater. By using this method, the content of organic phosphorus in the wastewater can be significantly reduced, the total phosphorus in the effluent can be reduced, and the wastewater treatment effluent can satisfy the discharge standard. The enriched organic phosphorus can be recycled as a phosphorus resource through incineration. In addition, the papermaking deinking sludge is made into the product with a high added value, so the applicability of the papermaking deinking sludge is broadened. The present disclosure has high feasibility.

8 Claims, 1 Drawing Sheet

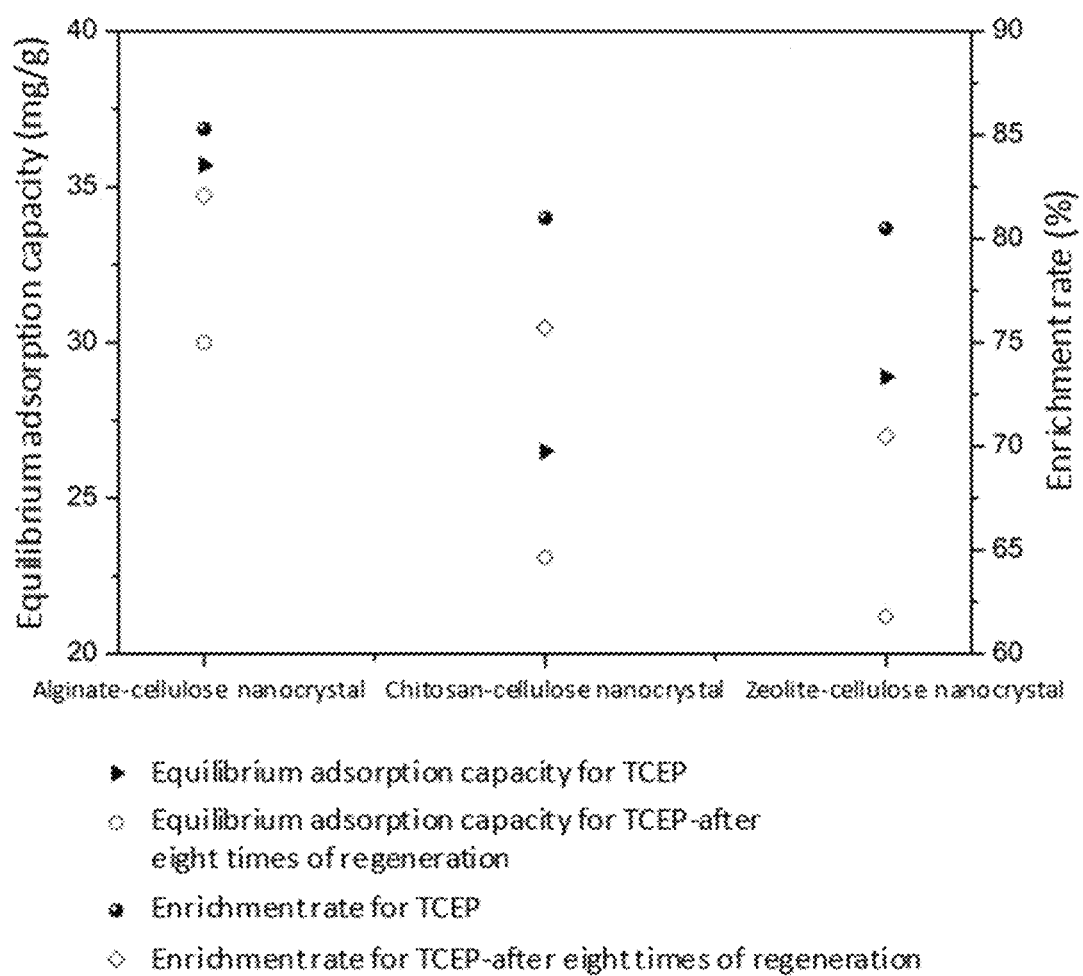

US 11,577,220 B2

CELLULOSE NANOCRYSTAL-SUPPORTED SODIUM ALGINATE ADSORBENT

TECHNICAL FIELD

The present disclosure relates to a cellulose nanocrystal-supported sodium alginate adsorbent and use thereof in enriching organic phosphorus in wastewater, belonging to the technical field of environmental engineering.

BACKGROUND

Under the background of resource utilization, waste paper is used as a paper making raw material for paper production, which will produce a large amount of papermaking deinking sludge. Owing to its high inorganic ash content, papermaking deinking sludge is easy to dewater. Also, owing to its high content of cellulose, the papermaking deinking sludge is generally used as an auxiliary fuel for municipal sludge incineration. This will not only increase the difficulty of sludge incineration, but also cause the waste of papermaking deinking sludge resources. Therefore, it is necessary to utilize the papermaking deinking sludge as a resource according to its properties and components. Nanocellulose, generally having a length of 500-800 nm and a diameter of 5-8 nm, retains the crystalline structure of natural cellulose and has good mechanical strength and high thermal stability. Cellulose nanocrystal is a kind of nanocellulose. It is generally recognized that the cellulose nanocrystals typically have a diameter D in the range of 2-4 nm, a length L in the range of 100-400 nm and an L/D ratio in the range of 80-100. If impurities are removed from the papermaking deinking sludge and the cellulose in the papermaking deinking sludge is made into cellulose nanocrystals, the applicability of the papermaking deinking sludge will be effectively broadened, and the added value of the papermaking deinking sludge will be increased. The selection of the sludge oxidation system after dewatering and drying of papermaking deinking sludge is the most important step for the preparation of cellulose nanocrystals. Determining the most suitable method for obtaining the cellulose source material and the most suitable method for preparing cellulose nanocrystals will effectively lift the limitation that the papermaking deinking sludge can only be used as an auxiliary material for incineration. In addition, China's well-developed printing and dyeing industry produces a large amount of printing and dyeing wastewater every year. In the printing and dyeing wastewater, thiol colorants represented by tris(2-carboxyethyl)phosphine (TCEP) is difficult to remove because of their good solubility and high stability, which will make a printing and dyeing wastewater treatment plant more difficult and costly to operate. Due to the increasing proportion of industrial wastewater entering the wastewater treatment plant, large amounts of organic phosphorus have been detected in the influent of the wastewater treatment plant. By supporting cellulose nanocrystals on alginate, it is expected to solve the problem of excessive total phosphorus in the effluent caused by the high concentration of soluble organic phosphorus in the printing and dyeing wastewater. Besides, recycling the enriched organic phosphorus through the cellulose nanocrystals can not only alleviate the crisis of phosphorus shortage, but also promote the development of techniques and processes for utilizing papermaking deinking sludge as a resource.

SUMMARY

Technical Problems

Papermaking deinking sludge is generally used as an auxiliary fuel for municipal sludge incineration, but not utilized as a resource, which makes the papermaking deinking sludge not utilized efficiently under the background of utilization of sludge as a resource. Based on the properties of the papermaking deinking sludge, the present disclosure breaks through the limitations in techniques of dewatering papermaking deinking sludge and preparing cellulose nanocrystals through an oxidation system, and the cellulose nanocrystals and alginate are coupled and used for enriching organic phosphorus in printing and dyeing wastewater in the field of resource utilization.

Technical Solutions

The present disclosure provides a method for preparing a cellulose nanocrystal-supported sodium alginate adsorbent, the method is supporting cellulose nanocrystals on sodium alginate. A process of preparing the cellulose nanocrystals includes the following steps:

(1) carrying out solid-liquid separation on a papermaking deinking sludge mixture, collecting the solid sludge, and then diluting the solid sludge with a buffer solution to obtain a sludge-water mixture;

(2) adding a flocculant and slaked lime to the sludge-water mixture obtained in step (1), mixing the mixture uniformly, then carrying out membrane filtration, and collecting sludge trapped on the filter membrane;

(3) treating the sludge obtained in step (2) by thermal drying until a water content of the sludge is not more than 30%, and crushing the sludge;

(4) rinsing the crushed sludge with the buffer solution, then adding 2,2,6,6-tetramethylpiperidinooxy free radical and sodium bromide, and mixing the mixture uniformly to form a mixed system; and (5) adding a terminating oxidizer to the mixed system obtained in step (4) until a pH of the reaction system no longer changes, terminating the reaction, carrying out solid-liquid separation, and collecting the solid to obtain the cellulose nanocrystals.

In an embodiment of the present disclosure, the method for preparing the cellulose nanocrystal-supported sodium alginate adsorbent includes the following steps:

(a) dispersing sodium alginate in a slightly acidic medium, slowly adding a dewatering filtrate obtained after the membrane filtration in step (2), and mixing the mixture uniformly to obtain a corresponding sodium alginate dispersion; dispersing the cellulose nanocrystals in a slightly acidic medium, and mixing the mixture uniformly to obtain a cellulose nanocrystal dispersion; and (b) then, slowly and dropwise adding the cellulose nanocrystal dispersion to the sodium alginate dispersion to obtain a sodium alginate-cellulose nanocrystal mixed solution, and concentrating and drying the sodium alginate-cellulose nanocrystal mixed solution to obtain the cellulose nanocrystal-supported sodium alginate adsorbent.

In an embodiment of the present disclosure, a process of obtaining the dewatering filtrate in step (a) includes: adding the flocculant and the slaked lime to the sludge-water mixture obtained in step (1) in the process of preparing the cellulose nanocrystals, mixing the mixture uniformly, then carrying out the membrane filtration, and after the sludge is trapped by the filter membrane, collecting the filtrate to obtain the dewatering filtrate.

In an embodiment of the present disclosure, a mass ratio of the sodium alginate to the cellulose nanocrystals is 2:0.2.

In an embodiment of the present disclosure, the slightly acidic medium is an acetic acid solution with a pH of 3.8-4.6.

In an embodiment of the present disclosure, a concentration of the sodium alginate dispersion is 10 g/L; and a concentration of the cellulose nanocrystals is 1 g/L.

In an embodiment of the present disclosure, the drying is carried out at a temperature of 170-220° C.

In an embodiment of the present disclosure, in the process of preparing the cellulose nanocrystals, the papermaking deinking sludge mixture in step (1) is taken from a paper mill in Jiaxing; and 500 mL is taken for experimentation.

In an embodiment of the present disclosure, in the process of preparing the cellulose nanocrystals, the buffer solution in step (1) is a phosphate buffer with a pH of 6.5-7.5.

In an embodiment of the present disclosure, in the process of preparing the cellulose nanocrystals, the flocculant in step (2) is selected from $AlCl_3$ and $FeCl_3$.

In an embodiment of the present disclosure, in the process of preparing the cellulose nanocrystals, a mass fraction of the flocculant in step (2) relative to the dry weight of the solid sludge is 5%-10%. The preferable range for $AlCl_3$ is 5%-9%. The preferable range for $FeCl_3$ is 3%-7%. Further, 8% of $AlCl_3$ or 5% of $FeCl_3$ is most preferable.

In an embodiment of the present disclosure, in the process of preparing the cellulose nanocrystals, a mass fraction of the slaked lime in step (2) relative to the dry weight of the solid sludge is 10%-25%, preferably 20%.

In an embodiment of the present disclosure, in the process of preparing the cellulose nanocrystals, the mixing uniformly in step (2) is carried out by stirring at a speed of 300 r/min for 2 min and then stirring at a speed of 50 r/min for 10 min.

In an embodiment of the present disclosure, in the process of preparing the cellulose nanocrystals, the membrane filtration in step (2) is vacuum filtration through a filter membrane. In step (2), the sludge is trapped on the filter membrane by the vacuum filtration, and the dewatering filtrate is collected for later use.

In an embodiment of the present disclosure, in the process of preparing the cellulose nanocrystals, the thermal drying in step (3) is carried out at a temperature of 170-220° C., preferably 200° C.

In an embodiment of the present disclosure, in the process of preparing the cellulose nanocrystals, an amount of the 2,2,6,6-tetramethylpiperidinooxy free radical added to the sludge in step (4) is 80 mg.

In an embodiment of the present disclosure, in the process of preparing the cellulose nanocrystals, a mass ratio of the sodium bromide to the 2,2,6,6-tetramethylpiperidinooxy free radical in step (4) is 80:80.

In an embodiment of the present disclosure, in the process of preparing the cellulose nanocrystals, the terminating oxidizer in step (5) is NaClO.

In an embodiment of the present disclosure, in the process of preparing the cellulose nanocrystals, the terminating oxidizer NaClO in step (5) is dropwise added to the mixed system in the form of a 5.0 mmol/L NaClO solution.

In an embodiment of the present disclosure, in the process of preparing the cellulose nanocrystals, the solid-liquid separation in step (5) includes microwave assisted separation and centrifugation.

In an embodiment of the present disclosure, the method for preparing the cellulose nanocrystals specifically includes:

(1) taking 500 ml of papermaking deinking sludge mixture, centrifuging the papermaking deinking sludge mixture, diluting the solid sludge with a phosphate buffer with a pH of 7.0 to 500 ml, and repeating this step 3 times;

(2) respectively adding $AlCl_3$ (5% of the dry weight of the sludge) and slaked lime (20% of the dry weight of the sludge) to the 500 ml of sludge-water mixture, carrying out 2 min of high speed stirring (at a speed of 300 r/min) and 10 min of low speed stirring (at a speed of 50 r/min), carrying out vacuum filtration to obtain sludge trapped on a filter membrane, and collecting the dewatering filtrate for later use;

(3) carrying out thermal drying at 200° C. until the water content in the sludge is reduced to 30%, and crushing the sludge for later use;

(4) rinsing the crushed sludge with the phosphate buffer with a pH of 7.0 to make the volume of the mixture reach 100 ml, and with medium speed stirring (at a speed of 150 r/min), adding 80 mg of (0.2 mmol) 2,2,6,6-tetramethylpiperidinooxy free radical (TEPMO) and 80 mg of (5.0 mmol) NaBr;

(5) after the TEPMO and the NaBr are completely dissolved, slowly and dropwise adding a 10.0 mmol/L NaClO solution until a pH of the reaction system no longer changes, terminating the reaction with a slight excess of anhydrous ethanol, and carrying out microwave assisted separation and centrifugation to obtain the cellulose nanocrystals.

In an embodiment of the present disclosure, the method for preparing the cellulose nanocrystal-supported sodium alginate adsorbent specifically includes the following steps:

(a) under slightly acidic conditions provided by acetic acid, adding 2 g of sodium alginate, slowly adding 50 mL of the dewatering filtrate obtained in step (2), carrying out stirring to make the sodium alginate thoroughly mixed with calcium ions in the dewatering filtrate and make the sodium alginate uniformly dispersed, thereby obtaining a sodium alginate dispersion; dissolving 0.2 g of cellulose nanocrystals in acetic acid, and uniformly mixing the mixture to obtain a cellulose nanocrystal dispersion; and (b) slowly adding the cellulose nanocrystal dispersion to the sodium alginate dispersion to obtain an alginate-cellulose nanocrystal mixed solution, drying the alginate-cellulose nanocrystal mixed solution in an oven at low temperature for 24 h, and after reaching an equilibrium water content, obtaining the cellulose nanocrystal supported sodium alginate adsorbent for later use.

The present disclosure further provides a cellulose nanocrystal supported sodium alginate adsorbent prepared by the above method.

The present disclosure further provides use of the cellulose nanocrystal-supported sodium alginate adsorbent in removing organic phosphorus in water.

Beneficial Effects

The present disclosure provides a method for preparing an alginate-cellulose nanocrystal adsorbent using cellulose nanocrystals prepared from papermaking deinking sludge and further enriching organic phosphorus in wastewater by using the alginate-cellulose nanocrystal adsorbent. The cellulose nanocrystals are prepared from papermaking deinking sludge through chemical conditioning, drying, crushing, chemical oxidation and microwave assisted separation, and then supported on alginate under weakly acidic conditions to provide the cellulose nanocrystals with the ability to enrich organic phosphorus in wastewater. By using this method, the content of organic phosphorus in the wastewater can be significantly reduced, the total phosphorus in the effluent can be reduced, and the wastewater treatment effluent can satisfy the discharge standard. The enriched organic phosphorus can be recycled as a phosphorus resource through incineration. In addition, the papermaking deinking sludge is made into the product with a high added value, so the applicability of the papermaking deinking sludge is broadened. The present disclosure has high feasibility.

When the alginate-cellulose nanocrystal provided by the present disclosure is mixed with 50 ml of printing and dyeing wastewater as the adsorbent, its equilibrium adsorption capacity for tris(2-carboxyethyl)phosphine (TCEP) is up to 35.7 mg/g, and the enrichment rate is more than 85%. The alginate-cellulose nanocrystal can be regenerated through ozone oxidation and reused to adsorb TCEP. After eight times of regeneration, the equilibrium adsorption capacity is still higher than 30.0 mg/g, which meets the requirement of cyclic utilization.

BRIEF DESCRIPTION OF FIGURES

FIG. 1 shows equilibrium adsorption capacities and enrichment rates of different adsorbents for TCEP.

DETAILED DESCRIPTION

The present disclosure will be described by examples according to the contents in the claims.

Example 1: Dewatering and Drying of Papermaking Deinking Sludge

10 L of papermaking deinking sludge mixture was acquired from a deinking wastewater treatment process section of a papermaking wastewater treatment site (a paper mill in Jiaxing). 500 mL of the sludge-water mixture that had been uniformly mixed was taken out (there were 6 duplicate samples), and centrifuged. Then, the solid sludge was diluted with a phosphate buffer with a pH of 7.0 for 3 times, and the final volume was adjusted to 500 mL. For 3 of the duplicate samples, the sludge-water mixture was subjected to vacuum filtration, the sludge sample trapped on the filter membrane was placed in an oven and dried at 105° C. for 4 h, and the dry weight of the papermaking deinking sludge was obtained. For the other 3 duplicate samples, $AlCl_3$ (5% of the dry weight of the sludge) and slaked lime (20% of the dry weight of the sludge) were sequentially added to the 500 mL of sludge-water mixture. After 2 min of high speed stirring (at a speed of 300 r/min) and 10 min of low speed stirring (at a speed of 50 r/min), vacuum filtration was carried out to obtain the sludge trapped on the filter membrane, and the dewatering filtrate was collected for later use. Thermal drying was carried out at 200° C. until the water content in the sludge was reduced to 30%, and the sludge was crushed for later use.

Example 2: Oxidation of Dried Papermaking Deinking Sludge and Separation of Cellulose Nanocrystals The crushed dried papermaking deinking sludge in the duplicate samples was taken and rinsed with the phosphate buffer with a pH of 7.0 to make the volume of the mixture reach 100 ml. With stirring at a speed of 150 r/min, 80 mg of (0.2 mmol) 2,2,6,6-tetramethylpiperidinooxy free radical (TEPMO) and 80 mg of (5.0 mmol) NaBr were sequentially added. After the TEPMO and the NaBr were completely dissolved, a 10.0 mmol/L NaClO solution was slowly and dropwise added until a pH of the reaction system no longer changed. Then, the reaction was terminated with a slight excess of anhydrous ethanol, and finally microwave assisted separation and centrifugation were carried out to obtain the cellulose nanocrystals.

Example 3: Establishment of Alginate-Cellulose Nanocrystal System

Under slightly acidic conditions provided by acetic acid, 2 g of sodium alginate was added to 100 mL of acetic acid solution (pH=4.5), 50 mL of the dewatering filtrate of the papermaking deinking sludge was slowly added, and stirring was carried out to make the sodium alginate thoroughly mixed with calcium ions in the dewatering filtrate and make the sodium alginate uniformly dispersed, thereby obtaining an alginate-acetic acid mixture. 0.2 g of the obtained cellulose nanocrystals was dissolved in 50 mL of acetic acid solution (pH=4.5). After the mixture was stirred uniformly, the alginate-acetic acid mixture was slowly added. Then, the obtained alginate-cellulose nanocrystal mixed solution was dried in an oven at a low temperature (75° C.) for 24 h. After reaching an equilibrium water content, the alginate-cellulose nanocrystal was collected for later use.

Example 4: Effect of Alginate-Cellulose Nanocrystal on Enriching Organic Phosphorus in Printing and Dyeing Wastewater The obtained alginate-cellulose nanocrystal was made into an adsorbent. The adsorbent was mixed with 50 mL of printing and dyeing wastewater (2.2 g of the adsorbent was used to treat 50 mL of printing and dyeing wastewater). It was found that the alginate-cellulose nanocrystal has a good effect on enriching organic phosphorus. Its equilibrium adsorption capacity for TCEP was up to 35.7 mg/g, and the enrichment rate was more than 85%. Therefore, the contribution of TCEP to the total phosphorus in the effluent was effectively reduced, and the effluent could satisfy the discharge standard. The alginate-cellulose nanocrystal could be regenerated through ozone oxidation and reused to adsorb TCEP. After the regeneration, the equilibrium adsorption capacity was still higher than 30.0 mg/g, which met the requirement of cyclic utilization. Therefore, it is determined that the cellulose nanocrystal prepared above has a good effect on enriching organic phosphorus and thus provides a new way for utilizing papermaking deinking sludge as a resource.

Comparative Example 1: Determination of Concentration of Terminating Oxidizer in Oxidation System Those that do not meet the conditions cannot become cellulose nanocrystals, nor can they be used to enrich organic phosphorus. Based on the average diameter D, the average length L and the L/D ratio, the concentration of the oxidizer was finally determined. As shown in Table 1, when NaClO was used as the terminating oxidizer, cellulose nanocrystals could not be obtained with relatively low concentrations of NaClO. When the concentration of NaClO was higher than 10 mmol/L, the oxidation system could successfully prepare the cellulose nanocrystals. Considering the preparation cost, 10 mmol/L was finally determined as the concentration of NaClO.

TABLE 1

Effect of NaClO terminating oxidizer on preparation of cellulose nanocrystals

| | Concentration | | | | |
|---|---|---|---|---|---|
| | 5.0 mmol/L | 8.0 mmol/L | 10 mmol/L | 12 mmol/L | 15 mmol/L |
| Average diameter D | 2.7 nm | 2.9 nm | 3.0 nm | 3.0 nm | 3.1 nm |
| Average length L | 295 nm | 277 nm | 270 nm | 263 nm | 255 nm |
| L/D | 109.3 | 69.3 | 90.0 | 87.7 | 82.3 |

Comparative Example 2: Separation of Cellulose Nanocrystals

Both the ultrasound method and the microwave method could separate the substance from the matrix. After investigating the characteristics of the cellulose nanocrystals under different energy densities, the most suitable method for separating cellulose nanocrystals was determined. As can be seen from Table 2, when the ultrasound method was used to separate the cellulose nanocrystals, satisfactory cellulose nanocrystals could not be prepared under the energy density of 1100 J/mL. As the energy density increased, the cellulose nanocrystals could be produced successfully. When the microwave method was used to separate the cellulose nanocrystals, the obtained cellulose nanocrystals were satisfactory in average diameter, average length and L/D. Considering the energy consumption, the microwave method with the energy density of 1000 J/ml was selected to separate the cellulose nanocrystals.

TABLE 2

Characteristics of cellulose nanocrystals obtained by different separation methods under different conditions

| | Microwave method | | | Microwave method | | |
|---|---|---|---|---|---|---|
| Microwave method J/mL | 1000 | 1250 | 1500 | 1100 | 1350 | 1600 |
| Average diameter D | 2.9 nm | 2.8 nm | 2.8 nm | 2.6 nm | 2.7 nm | 2.8 nm |
| Average length L | 285 nm | 265 nm | 230 nm | 272 nm | 265 nm | 260 nm |
| L/D | 98.3 | 94.6 | 82.1 | 104.6 | 98.1 | 92.9 |

Comparative Example 3: Effects of Cellulose Nanocrystals Supported on Different Matrices on Enriching Organic Phosphorus In order to investigate the effect of cellulose nanocrystal-based adsorbents on enriching organic phosphorus (TCEP) in printing and dyeing wastewater, alginate-cellulose nanocrystal (with additional calcium ions), alginate-cellulose nanocrystal (with the sludge dewatering filtrate), chitosan-cellulose nanocrystal and zeolite-cellulose nanocrystal were respectively tested for their effect on enriching organic phosphorus. By adding CaO to condition the papermaking deinking sludge, the sludge dewatering filtrate had a relatively higher concentration of calcium ions. As shown in Table 3, the chitosan-cellulose nanocrystal and the zeolite-cellulose nanocrystal were selected to enrich the TCEP, their equilibrium adsorption capacities and enrichment rates were respectively lower than those of the adsorbents using alginate as the matrix. When the alginate solution was prepared with the additional calcium ions, its initial equilibrium adsorption capacity and enrichment rate were higher than those of the alginate solution prepared with the sludge dewatering filtrate. However, after eight times of regeneration, their equilibrium adsorption capacities and enrichment rates for TCEP were almost the same. Therefore, considering the convenience in operation and the cost, the alginate prepared with the sludge dewatering filtrate was selected, and the alginate-cellulose nanocrystal formed therewith was the more effective and economical adsorbent for enriching organic phosphorus in printing and dyeing wastewater.

TABLE 3

Effect of cellulose nanocrystal adsorbents on enriching organic phosphorus

| | [a]Alginate-cellulose nanocrystal | [b]Alginate-cellulose nanocrystal | Chitosan-cellulose nanocrystal | Zeolite-cellulose nanocrystal |
|---|---|---|---|---|
| Equilibrium adsorption capacity for TCEP (mg/g) | 38.5 | 35.7 | 26.5 | 28.9 |
| Enrichment rate for TCEP (%) | 88.7 | 85.3 | 81.0 | 80.5 |
| Equilibrium adsorption capacity[c] for TCEP (mg/g) | 30.1 | 30.0 | 23.1 | 21.2 |
| Equilibrium adsorption capacity[c] for TCEP (mg/g) | 82.0 | 82.1 | 75.7 | 70.5 |

[a]alginate matrix prepared with additional calcium ions;
[b]alginate matrix prepared with calcium ions in the sludge dewatering filtrate;
[c]effect on enriching TCEP after eight times of regeneration.

What is claimed is:

1. A method for preparing a cellulose nanocrystal-supported sodium alginate adsorbent wherein the method is supporting cellulose nanocrystals on sodium alginate; wherein
   a process of preparing the cellulose nanocrystals comprises the following steps:
   (1) carrying out solid-liquid separation on a papermaking deinking sludge mixture, collecting the solid sludge, and then diluting the solid sludge with a buffer solution to obtain a sludge-water mixture;
   (2) adding a flocculant and slaked lime to the sludge-water mixture obtained in step (1), mixing the mixture uniformly, then carrying out membrane filtration, and collecting sludge trapped on the filter membrane;
   (3) treating the sludge obtained in step (2) by thermal drying until a water content of the sludge is not more than 30%, and crushing the sludge;
   (4) rinsing the crushed sludge with the buffer solution, then adding 2,2,6,6-tetramethylpiperidinooxy free radical and sodium bromide, and mixing the mixture uniformly to form a mixed system; and
   (5) adding a terminating oxidizer to the mixed system obtained in step (4) until a pH of the reaction system no longer changes, terminating the reaction, carrying out solid-liquid separation, and collecting the solid to obtain the cellulose nanocrystals.

2. The method according to claim 1, wherein the method for preparing the cellulose nanocrystal-supported sodium alginate adsorbent comprises the following steps:
   (a) dispersing sodium alginate in a slightly acidic medium, slowly adding a dewatering filtrate obtained after the membrane filtration in step (2), and mixing the mixture uniformly to obtain a corresponding sodium alginate dispersion; dispersing the cellulose nanocrystals in a slightly acidic medium, and mixing the mixture uniformly to obtain a cellulose nanocrystal dispersion; and
   (b) then, slowly and dropwise adding the cellulose nanocrystal dispersion to the sodium alginate dispersion to obtain a sodium alginate-cellulose nanocrystal mixed solution, and concentrating and drying the sodium alginate-cellulose nanocrystal mixed solution to obtain the cellulose nanocrystal-supported sodium alginate adsorbent.

3. The method according to claim 1, wherein a mass ratio of the sodium alginate to the cellulose nanocrystals is 2:0.2.

4. The method according to claim 2, wherein the slightly acidic medium is an acetic acid solution with a pH of 3.8-4.6.

5. The method according to claim 2, wherein a concentration of the sodium alginate dispersion is 10 g/L; and a concentration of the cellulose nanocrystals is 1 g/L.

6. The method according to claim 1, wherein in the process of preparing the cellulose nanocrystals, the terminating oxidizer in step (5) is NaClO.

7. The method according to claim 1, wherein in the process of preparing the cellulose nanocrystals, a mass fraction of the flocculant in step (2) relative to the dry weight of the solid sludge is 5%-10%.

8. The method according to claim 1, wherein in the process of preparing the cellulose nanocrystals, a mass fraction of the slaked lime in step (2) relative to the dry weight of the solid sludge is 10%-25%.

* * * * *